United States Patent Office 3,020,317
Patented Feb. 6, 1962

3,020,317
POLYNITRO ALCOHOLS AND SALTS THEREOF
Karl Klager, Monrovia, Calif., assignor to Aerojet-General Corporation, Azusa, Calif., a corporation of Ohio
No Drawing. Filed May 29, 1957, Ser. No. 662,549
20 Claims. (Cl. 260—632)

This invention relates to nitrohydroxy compounds and in particular to the hydroxy compounds of 2,2,4,4-tetranitrobutanol and the salts thereof.

The object of this invention is to provide compounds useful as explosives and propellants, and which are also useful in the preparation of other explosives and propellants.

The compounds are prepared by acidifying salts of dinitro ethanol with an acid to form the salt of 2,2,4,4-tetranitrobutanol from which the free alcohol may be prepared by adding additional acid. These compounds may be further reacted to form other useful explosive compositions as disclosed in assignees copending U.S. application No. 371,150, filed July 29, 1953, now abandoned.

The reaction proceeds according to the general reaction scheme set forth below wherein M is a member of the group consisting of the alkali metals, alkaline earth metals, and the ammonia radical.

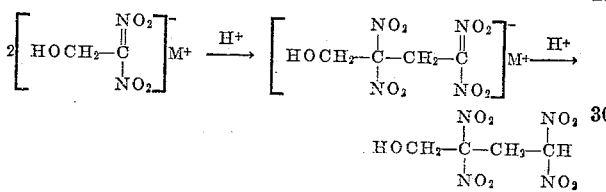

The starting materials are prepared by the method of Duden and Ponndorf described in Ber. 38, 2033.

The following examples are provided solely for illustrative purposes and do not in any way define either the scope or the limits of my invention.

*Example I.—Preparation of the potassium salt of 2,2,4,4-tetranitro butanol*

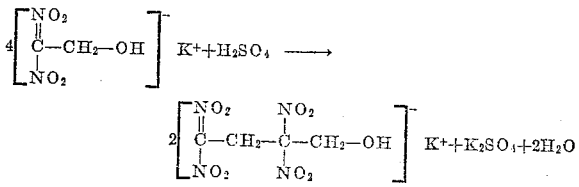

The procedure is carried out in the following manner: A 3-necked reactor equipped with a stirrer, thermometer and dropping funnel is charged with 1200 ml. of distilled water and two moles of postassium dinitroethanol dampened with water. The water is stirred and the temperature throughout the reaction is maintained at from between 18–20° C. 136 ml. of 30% sulphuric acid, formed by adding 73 ml. of concentrated sulphuric acid to 300 ml. of water, is added slowly over a period of 30 minutes until the solution has obtained a pH of between 4.0 and 4.2. After the acid is added the slurry is stirred for two hours longer during which time the color of the salt changes from bright yellow to golden yellow. The mixture is cooled to 30° C. and filtered through a Büchner funnel and mounted on a vacuum filter flask. The solid is immediately washed with about one liter of methanol and the damp salt is removed and stored in a cool place. This process produced about 300 grams of an orange damp crystalline salt which contains approximately 20% solvent. The damp salt has an impact sensitivity of about 50 cm./2 kg. and when dried the sensitivity of the salt is reduced to 5 cm. for a 2 kg. weight.

The salt may be deformylated by the action of a strong base to yield tetranitro propane which can be readily identified.

In the same manner the other basic salts described previously can be prepared by utilizing the corresponding dinitro ethanol salt.

*Example II.—Preparation of 2,2,4,4-tetranitro butanol*

Approximately 5.84 gm. of the salt of 2,2,4,4-tetranitrobutanol, as prepared in Example I, was suspended in 30 ml. of water and 5 ml. of 30% sulphuric acid added at room temperature. The crystals were observed to dissolve and after a few seconds a resinous yellowish material formed. After two extractions with methylene chloride the solvent was removed by vacuum distillation at room temperature and a yield of 3.55 gm. of yellow viscous oil was obtained. This oil was again dissolved in 3.5 ml. methylene chloride and cooled with a Dry Ice acetone mixture. White needles were observed to separate from the solution when cooled at approximately —70° C.

The free alcohol, 2,2,4,4-tetranitro butanol may be prepared alternatively in accordance with the reaction scheme set forth below.

II

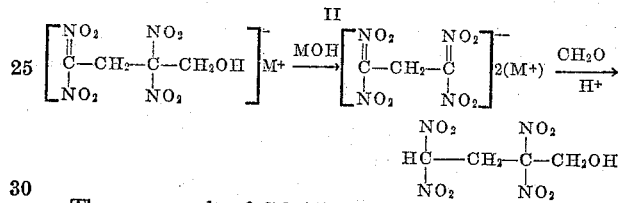

The mono salt of 2,2,4,4-tetranitro butanol is readily converted to the double salt of 1,1,3,3-tetranitro propane which in turn may be converted to the 2,2,4,4-tetranitro butanol compound by reaction with formaldehyde in acid medium.

Any hydroxy base of the alkali and alkaline earth metals as well as ammonia may be utilized in preparing either the mono or the di-salt of the tetranitro compound.

The pH range for the conversion to the mono salt described in Example I must be maintained within the range of from about pH 2.0 to 6.0. However, optimum results are obtained by maintaining the pH between about 4.0 and 4.2. Suitable acids include sulfuric, nitric, phosphoric, hydrochloric, hydrobromic, hydrofluoric, acetic, trifluoroacetic, formic, and oxalic acid as well as sulfur trioxide gas and sulfonic acid adducts. In short, any acid capable of providing a pH in the range of from about 2.0 to 6.0 is suitable for this purpose.

2,2,4,4-tetranitrobutanol is readily converted to 2,2,4,4-tetranitro-1,5-pentanediol by the reaction of formaldehyde upon its alkali or alkaline earth metal salts as disclosed in assignee's copending U.S. patent application No. 371,150, July 29, 1953. The tetranitro-1,5-pentanediol compound thus obtained can be further reacted with nitro-substituted amines such as 3,3,3-trinitropropylamine to yield nitroalkyl substituted tetranitropiperidine compounds which are useful as high explosives, and can be used in any conventional explosive missile, projectile, rocket, or the like, as the main explosive charge. An example of such a missile is disclosed in U.S. Patent No. 2,470,162, issued May 17, 1949. One way of using the tetranitropiperidine high explosives in a device such as that disclosed in U.S. Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time-fuse mechanism firing a detonating explosive such as lead azide or mercury fulminate.

This application is a continuation-in-part of application Serial No. 371,149, filed July 29, 1953, now abandoned.

I claim:

1. A composition of matter selected from the group consisting of 2,2,4,4-tetranitrobutanol and the alkali metal, alkaline earth metal, and ammonium salts thereof.

2. 2,2,4,4-tetranitrobutanol having the structural formula:

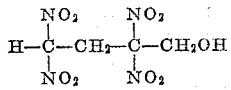

3. The alkali metal salts of 2,2,4,4-tetranitrobutanol.

4. The alkaline earth metal salts of 2,2,4,4-tetranitrobutanol.

5. The ammonium salt of 2,2,4,4-tetranitrobutanol.

6. The potassium salt of 2,2,4,4-tetranitrobutanol.

7. The method for preparing the compound selected from the group consisting of 2,2,4,4-tetranitrobutanol, the alkali metal, alkaline earth metal, and the ammonium salts thereof, which comprises reacting a salt selected from the group consisting of the alkali metal, alkaline earth metal, and ammonium salts of dinitro ethanol with acid at a pH of from about 2.0 to 6.0 and subsequently adjusting the pH to obtain the desired product.

8. The method described in claim 7 wherein the pH is maintained within the range of from about 4.0 to 4.2 until the reaction is complete.

9. The method of preparing an alkali metal salt of 2,2,4,4-tetranitrobutanol which comprises reacting an alkali metal salt of dinitro ethanol with acid at a pH within the range of from about 2.0 to 6.0.

10. The method described in claim 9 wherein the pH is maintained within a range of from about 4.0 to 4.2.

11. The method of preparing an alkaline earth metal salt of 2,2,4,4-tetranitrobutanol which comprises reacting an alkaline earth metal salt of dinitro ethanol with acid at a pH within the range of from about 2.0 to 6.0.

12. The method described in claim 11 wherein the pH is maintained within the range of from about 4.0 to 4.2.

13. The method of preparing an ammonium salt of 2,2,4,4-tetranitrobutanol which comprises reacting the ammonium salt of dinitro ethanol with acid at a pH within the range of from about 2.0 to 6.0.

14. The method described in claim 13 wherein the pH is maintained wtihin the range of from about 4.0 to 4.2.

15. The method of preparing a potassium salt of 2,2,4,4-tetranitrobutanol which comprises reacting a potassium salt of dinitro ethanol with acid at a pH wtihin the range of from about 2.0 to 6.0.

16. The method described in claim 15 wherein the pH is maintained within the range of from about 4.0 to 4.2.

17. The method of preparing 2,2,4,4-tetranitrobutanol which comprises reacting the salt selected from the group consisting of alkali metal, alkaline earth metal, and ammonium salts of dinitro ethanol with acid at a pH within the range of from about 2.0 to 6.0; recovering the resultant salt of 2,2,4,4-tetranitrobutanol, and subsequently neutralizing with additional acid to obtain 2,2,4,4-tetranitrobutanol.

18. The method of claim 17 wherein the pH is maintained within the range of from about 4.0 to 4.2 during the formation of the tetranitrobutanol salt.

19. The method of claim 17 wherein the salt of dinitro ethanol used is the ammonium salt.

20. The method of claim 17 wherein the salt of dinitro alcohol used is the potassium salt.

No references cited.